United States Patent [19]

Proulx

[11] Patent Number: 5,752,640
[45] Date of Patent: May 19, 1998

[54] COLLAPSIBLE BICYCLE CARRIER FOR VEHICLES

[76] Inventor: Ronald E. Proulx, 3 Garland Rd., Dollard Des Ormeaux, Quebec, Canada, H9G 2B5

[21] Appl. No.: 720,240

[22] Filed: Sep. 26, 1996

[30] Foreign Application Priority Data

Dec. 13, 1995 [CA] Canada ................... 2165090

[51] Int. Cl.⁶ .................... B60R 9/06; B60R 9/10
[52] U.S. Cl. .......... 224/572; 224/493; 224/314; 224/318; 224/329; 224/924
[58] Field of Search .............. 224/572, 924, 224/492, 493, 494, 488, 489, 309, 314, 318, 321, 329

[56] References Cited

U.S. PATENT DOCUMENTS

| | | | |
|---|---|---|---|
| 2,196,341 | 4/1940 | Rush | 224/318 |
| 3,927,811 | 12/1975 | Nussbaum | 224/493 |
| 5,215,233 | 6/1993 | Baldeck | 224/42.03 B |
| 5,230,449 | 7/1993 | Collins et al. | 224/42.03 B |
| 5,361,959 | 11/1994 | Allen | 224/314 |

*Primary Examiner*—Charles R. Eloshway

[57] ABSTRACT

A collapsible carrier for transporting a bicycle on the rear or front bumper of a vehicle, which consists primarily of three soft, flexible straps with buckles holding the bicycle under tension at an angle away from the vehicle while the tires rest in the internal angle formed by the junction of the exterior wall of the trunk or hood and the top surface of the bumper. Two upper straps of the carrier are at a first end looped through themselves to the handle bar stem and to the seat post of the bicycle. The two upper straps are then crossed near their mid-point to form an X and at a second end looped to the upper corners of the trunk or hood lid. A third strap of the carrier is at a first end looped through itself to the seat post of the bicycle and at a second end vertically attached to the underside of the bumper of the vehicle by way of a hook. The straps are adjusted and tightened by way of locking adjustable buckles.

12 Claims, 5 Drawing Sheets

5,752,640

COLLAPSIBLE BICYCLE CARRIER FOR VEHICLES

The present invention relates to bicycle carriers, particularly to bicycle carriers for mounting a bicycle or other light-weight two wheeled vehicle on the rear or even on the front of an automobile or other four-wheeled vehicle.

There are numerous patents for apparatuses designed for mounting and carrying bicycles on automobiles.

Some devices carry bicycles on top of a vehicle, such as U.S. Pat. No. 4,524,893, dated Jun. 25, 1985, granted to Cole for a "Bicycle Carrier". Top bicycle carriers are difficult to mount and dismount a bicycle and create substantial wind drag for the vehicle. Other carriers are designed for mounting bicycles or motorcycles on the front or the back of the automobile, such as those contained in U.S. Pat. No. 4,332, 337, dated Jun. 1, 1982, granted to Kosecoff for a "Foldable Bicycle Carrier", and U.S. Pat. No. 3,993,229, dated Nov. 23, 1976, granted to Summers for a "Pivotable Bumper for Carrying Motorcycles". However, for the most part these bicycle carriers are difficult to install, cause damage to the vehicle, are cumbersome and can neither be stored nor carried easily by the biker.

Other attempts have been made to overcome the problems associated with the above referenced patented inventions, including U.S. Pat. No. 3,923,221, dated Dec. 2, 1975, granted to Ballinger for a "Bicycle Carrier" which employs cable-like cords to attach the bicycle to the vehicle. However, the Ballinger device does not hold the bicycle firmly in place away from the vehicle but rather allows it to rub against the vehicle bumper, thereby scratching and damaging the paint and the bumper of the vehicle and the bicycle. Furthermore, since the bicycle wheels do not rest on the bumper the Ballinger device may not be used for carrying heavy bicycles or motorcycles because there is nothing firmly supporting the weight of the bicycle. The same can be said about U.S. Pat. No. 5,230,449, dated Jul. 27, 1993, granted to Collins and Cass for a "Collapsable Bicycle Carrier for Vehicles", which also includes rigid strap assemblies, cylinders, a pedal pad and a multitude of straps making it cumbersome for the biker to transport.

The attempt made in U.S. Pat. No. 5,215,233, dated Jun. 1, 1993, granted to Baldeck for a "Bicycle Carrier for Vehicles", requires not only many strap assemblies to secure the bicycle laterally but also a telescoping rod which holds the bicycle away from the vehicle. This device can not easily be stored or carried by the biker. As well, an addition to the strap embodiment is necessary for use with bicycles which do not have a crossbar, such as the ordinary female bicycle.

All of the above referenced problems are resolved by the instant invention in its various embodiments described hereinafter. The instant invention also provides numerous advantages over the prior art. It is economical by use of only straps and buckles contrary to most bicycle carriers which require several feet of metal tubing. The invention also eliminates damage caused by rubbing of the carrier or bicycle against the vehicle by positioning the bicycle at an angle keeping all metal parts away from the vehicle. Also the lateral and vertical stability of the bicycle provided by the configuration of the embodiments eliminates the need for securing the wheels of the bicycle to the bumper of the vehicle. The instant invention can also be used to secure virtually all types of bicycles to virtually all types of vehicles without requiring modifications or tools for attachment. Moreover it is lightweight, collapsible and easy to carry since it consists of a set of straps without a cumbersome metal frame. Thus, the device does not take up any space and can be stored easily in a glove compartment or carried by the bicyclist himself.

The present invention consists of three soft, flexible straps with buckles; two upper straps and one lower strap used to attach a bicycle to a vehicle in the following manner. The two upper straps are at a first end looped through themselves to the handle bar stem and to the seat post of the bicycle by way of a loop having an internal diameter of approximately three inches at the first end. The two upper straps are then crossed near their mid-point to form an X whereby providing lateral stability to the bicycle and at a second end looped to the upper corners of the trunk or hood lid of the vehicle by way of a loop having an internal diameter of approximately twelve inches at the second end. The two upper straps may alternatively both be looped through themselves to the seat post of the bicycle to form a V at the first end. The bicycle is then raised to be supported by the bumper of the vehicle and positioned by way of locking adjustable buckles at an angle, preferably between 30° and 45° from the horizon, keeping all metal parts away from the vehicle and allowing the two wheels of the bicycle to rest in the internal angle formed by the junction of the exterior wall of the trunk or hood and the top surface of the bumper. In this position, the weight of the bicycle is distributed evenly to both straps keeping them under tension. The third strap is then at a first end looped through itself to the seat post of the bicycle by way of a loop having an internal diameter of approximately three inches at the first end and vertically attached at a second end to the underside of the bumper of the vehicle by way of a hook or alike. The lower strap is then tightened by way of a locking adjustable buckle whereby preventing the bicycle from being thrown onto the vehicle should the vehicle stop abruptly.

In the description hereinbelow, reference will be made to the appended sheets of drawings in which:

FIG. 1 is a side view of the bicycle carrier, showing the position of the bicycle with the tires resting in the internal angle formed by the junction of the exterior wall of the trunk or hood and the top surface of the bumper; and FIG. 2 is a perspective view of the bicycle carrier showing the three strap embodiments in place on the vehicle wherein the two upper straps are crossed near their mid-point; and FIG. 3 is a perspective view of the bicycle carrier showing the three strap embodiments in place on the vehicle wherein the two upper straps are joined at the first end; and FIG. 4 is a perspective view of one of the upper straps;

Figure 1:
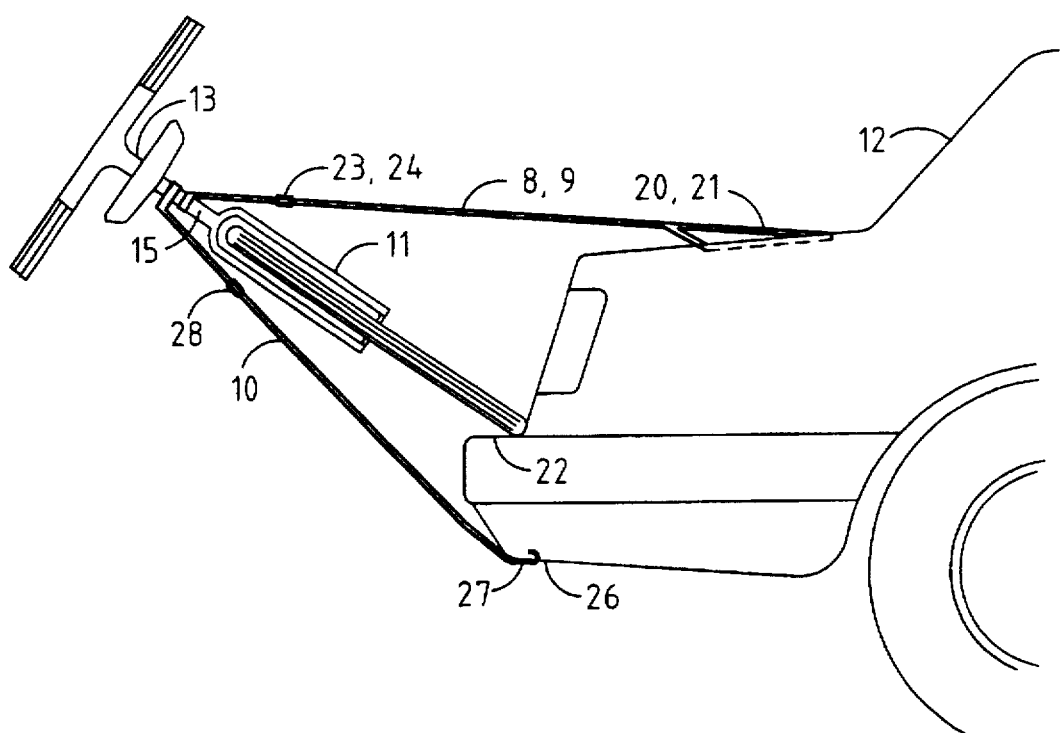

Having described the invention in general terms hereinabove, the preferred embodiments of this invention will now be described in detail by reference to the drawing appended hereto as FIGS. 1 though 5.

Figure 2:
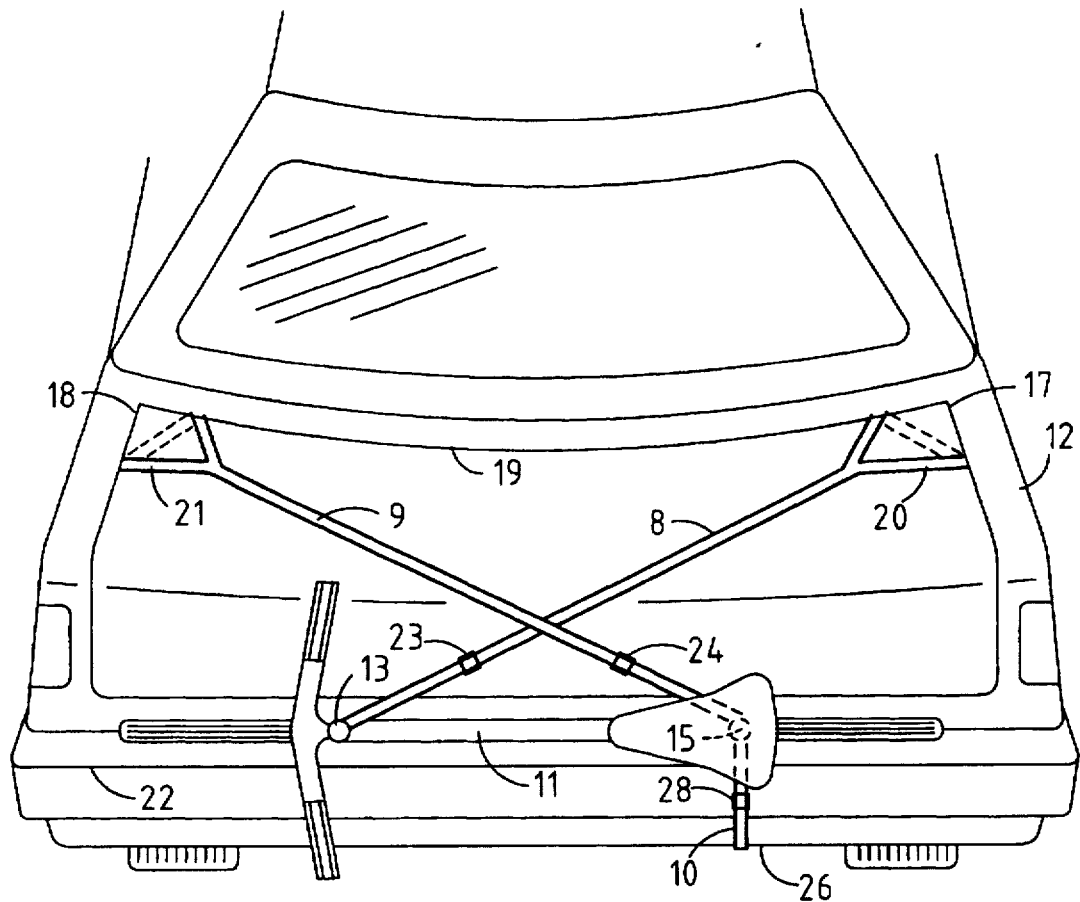

FIGS. 1 and 2 illustrate the embodiment of the invention as it utilizes three straps, detailed in FIGS. 4 and 5, hereinafter referred to as "the upper right hand strap" 8, "the upper left hand strap" 9 and "the lower strap" 10, to secure a bicycle 11 to a vehicle 12.

Figure 6:
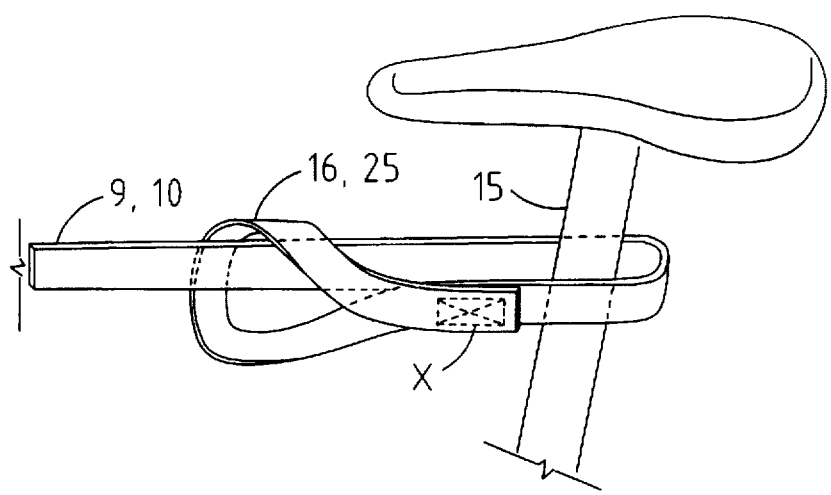
FIG. 6 is a fragmentary perspective view of one of the upper straps in an operative position.
Figure 7:
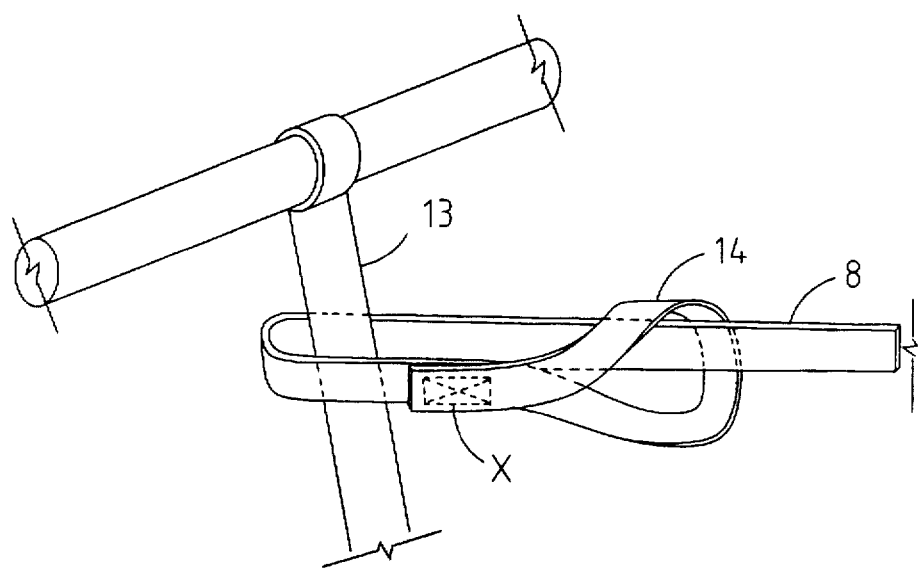
FIG. 7 is a fragmentary perspective view of the other upper strap in an operative position.

The upper right hand strap 8 is at a first end looped through itself to the handle bar stem 13 of the bicycle 11 by way of a loop 14 having an internal diameter of approximately three inches at the first end (FIG. 7). The upper left hand strap 9 is at a first end looped through itself to the seat post 15 of the bicycle 11 by way of a loop 16 having an internal diameter of approximately three inches at the first end (FIG. 6). The upper right hand strap 8 and the upper left hand strap 9 are then crossed near their mid-point to form an X whereby providing lateral stability to the bicycle 11. The upper right hand strap 8 and the upper left hand strap 9 are then at the second end looped to the upper right hand corner 17 and the upper left hand corner 18 of the trunk or hood lid 19 of the vehicle 12 by way of loops 20, 21 having an internal diameter of approximately twelve inches at the second end. The bicycle 11 is then raised to be supported by the bumper 22 of the vehicle 12 and positioned by way of locking adjustable buckles 23, 24 at an angle, preferably between 30° and 45° from the horizon. The lower strap 10 is then at a first end looped through itself (in the same manner as the upper straps as depicted in FIGS. 6 and 7) to the seat post 15 of the bicycle 11 by way of a loop 25 having an internal diameter of approximately three inches at the first end and vertically attached at a second end to the underside 26 of the bumper 22 of the vehicle 11 by way of a hook 27 or alike. The lower strap 10 is then tightened by way of a locking adjustable buckle 28.

Figure 3:
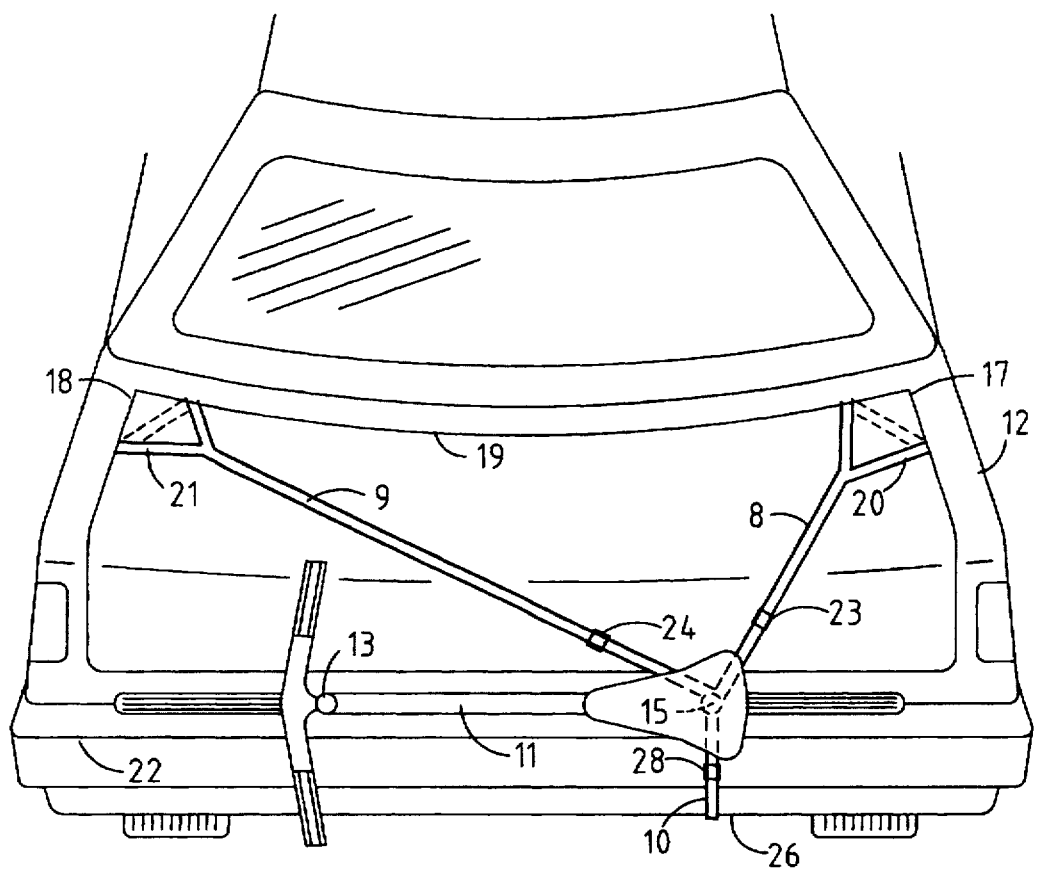

Lateral stability may also be achieved, as illustrated in FIG. 3, wherein the straps 8, 9 are joined at the first end to form a V.

Figure 4:
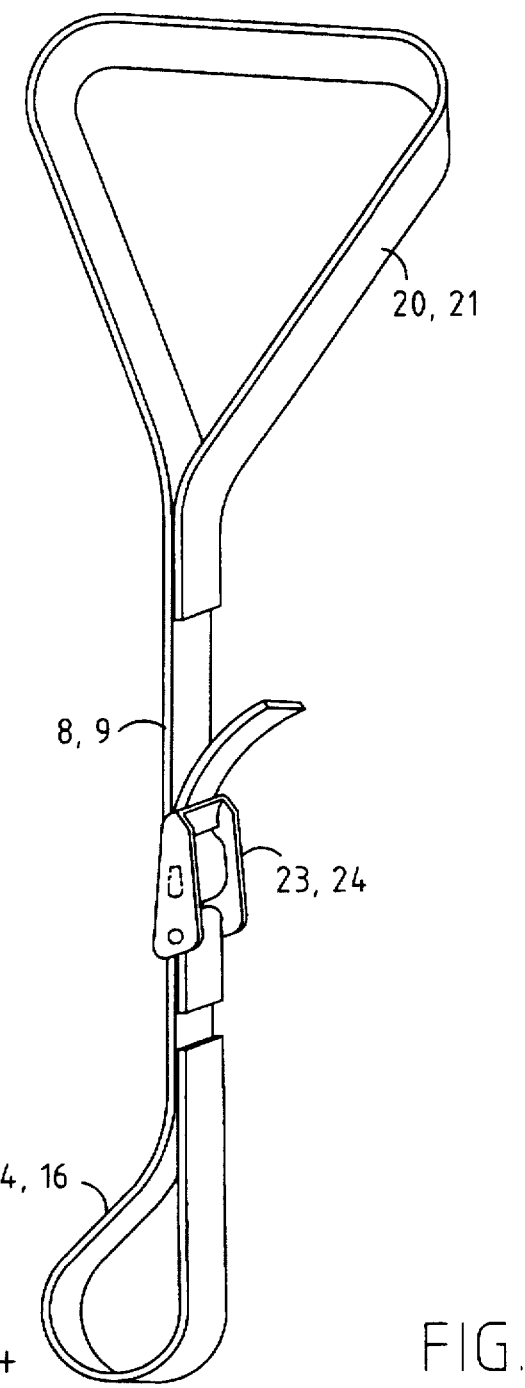
Figure 5:
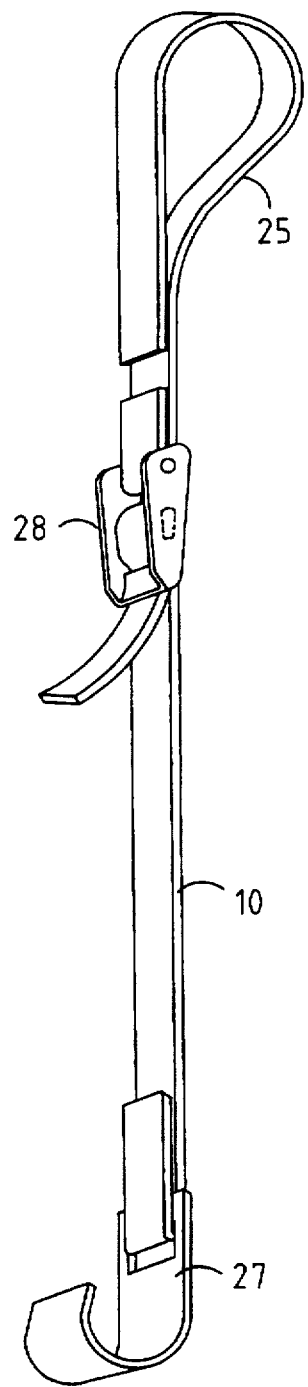
FIG. 5 is a perspective view of the lower strap.

Detailed drawings of the strap assemblies are set fourth in FIGS. 4 and 5. As can be seen in these figures, by providing relatively long straps 8, 9, 10 and providing locking adjustable buckles 23, 24, 28, the carrier can be configured to fit virtually any bicycle and virtually any vehicle.

The straps 8, 9, and 10 of this invention are preferably made of soft nylon webbing. However, such straps may be made of other materials having suitable properties, such as cotton and even plastic coated metal wire. The loops 14, 16, 20, 21, and 25 are formed by folding the ends of the straps onto the respective strap and stitching the ends to the straps as shown at x as is well known in the art.

The buckles 23, 24 and hook 27 of this invention are preferably made of hard resilient plastic which can be pressed or molded. However, such buckles and hook may be made of other materials having suitable properties. Examples include metals such as aluminum and steel.

Since certain changes in the foregoing disclosure are readily apparent without departing from the scope of the invention herein described, the foregoing disclosure is intended to be construed in an illustrative sense and not in any manner a limiting sense.

The embodiments of the invention in which an exclusive property or privilege is claimed are defined as follows:

1. A collapsible bicycle carrier adapted for carrying a bicycle on the rear or front bumper of a vehicle having a trunk and hood lid, said carrier comprising:
   a pair of upper adjustable flexible straps with fastening means at a first end for attachment to an upper portion of the bicycle and means for attachment to the trunk or hood lid at a second end;
   a singular lower adjustable flexible strap with fastening means at a first end for attachment to an upper portion of a bicycle and means for attachment to a vehicle bumper at a second end; and
   wherein the fastening means of the upper straps include loops formed in the first ends of the upper straps through which are passed the respective second end of each upper strap to form a second loop for surrounding the handle bar stem and the seat post of the bicycle, respectively, the means for attachment to the trunk or hood lid including loops formed in the second ends of the upper straps for looping around the upper right hand corner and around the upper left hand corner, respectively, of the trunk or hood lid of the vehicle; and
   the fastening means of the lower strap include a loop formed in the first end of the lower strap through which is passed the second end of the lower strap to form a second loop for surrounding the seat post of the bicycle.

2. A collapsible bicycle carrier as described in claim 1, wherein the bicycle is positioned at an angle preferably between 30° and 45° from the horizontal plane of the vehicle whereby keeping all metal parts of the bicycle away from the vehicle.

3. A collapsible bicycle carrier as described in claim 1, wherein the tires of the bicycle are adapted to rest in the internal angle formed by the junction of the exterior wall of the trunk or hood lid and the top surface of the respective rear or front bumper of the vehicle.

4. A collapsible bicycle carrier as described in claim 1, wherein the loops formed in the first ends of the upper straps have an internal diameter of approximately three inches; and
   the loops formed in the second ends of the upper straps have an internal diameter of approximately twelve inches.

5. A collapsible bicycle carrier as described in claim 4, wherein said loops formed in the first and second ends of the upper straps and the loop formed in the first end of the lower strap are created by stitching the respective end of the strap onto itself.

6. The bicycle carrier as defined in claim 1, wherein the means for attachment at the second end of the lower strap is a hook for engaging the underside of the bumper.

7. A collapsible and portable bicycle carrier for removable attachment to the rear or front of a vehicle, said carrier comprising:
   a means for securing a bicycle body in a desired position wherein the tires of the bicycle rest in the internal angle formed by the junction of the exterior wall of the trunk or hood lid and the top surface of the respective rear or front bumper, the body of the bicycle being positioned at an angle between 30° and 45° from the horizon whereby keeping all metal parts of the bicycle away from the vehicle;
   said means for securing comprising:
      a pair of adjustable flexible straps having loops formed in first ends thereof through which are passed the respective second ends of each strap for securement of the first ends to the handle bar stem or seat post of the bicycle, the loops having an internal diameter of approximately three inches, the flexible straps having loops formed in the second ends thereof, the loops formed in the second ends having an internal diameter of approximately twelve inches; and
      a single adjustable flexible strap having a loop formed in a first end thereof through which is passed the second end of the single flexible strap for securement of the first end to the seat post of the bicycle, the loop having an internal diameter of approximately three inches, the single flexible strap having a hook connected to the second end for removably securing the second end to the underside of the respective front or rear bumper;
      each of said pair of flexible straps and said single flexible strap including locking adjustable buckles for adjusting the length thereof; wherein
      in a first configuration, the first ends of the pair of straps are secured to the handle bar stem and seat post, respectively, and the second ends are secured around opposite upper corners of the trunk or hood lid, the straps being crossed proximate their midpoints so as to form and X shape, and in a second configuration, the first ends of the pair of straps are both secured to the seat post and the second ends are secured around opposite upper corners of the trunk or hood lid, forming a V shape.

8. A method for carrying a bicycle on a vehicle, wherein the vehicle has a front and a rear bumper, a hatch cover at the front and rear of the vehicle adjacent and upwardly spaced from the respective bumper, the hatch cover having at least a pair of laterally spaced-apart corners directed away from the respective bumper, and wherein the bicycle has a pair of wheels and a frame with an upper portion extending above the wheels in a common plane, the method consisting of the steps of providing a pair of upper adjustable flexible straps each having a pair of ends formed with a loop, passing the loop of the one end of each upper strap around a respective corner of the hatch cover, securing the other end of each upper adjustable strap around an upper portion of the bicycle frame for supporting the bicycle while placing the wheels of the bicycle on the bumper such that the bicycle is supported in the common plane at an acute angle to the horizontal plane of the vehicle, and providing a lower adjustable strap having an end with an attachment means and attaching the attachment means to the bumper at a location spaced from the common plane containing the bicycle, the other end of the lower adjustable strap being formed with a loop and securing said other end around an upper portion of the bicycle frame so as to substantially form a triangle between the lower adjustable strap, the common plane of the bicycle and the bumper and maintaining the upper and lower straps in tension, such that the bicycle is carried in a stable manner on the vehicle, solely by the straps.

9. The method as defined in claim 8, wherein the loops of the other ends of the upper straps are passed around spaced-apart portions of the upper portion of the frame and the two upper straps are crossed to form an X.

10. The method as defined in claim 8, wherein the loops of the other ends of the upper straps are passed around a common point on the upper portion of the frame to form a triangle between the upper straps and the corners of the hatch cover.

11. The method as defined in claim 8, wherein the common plane of the bicycle is maintained at an angle of between 30 degrees and 45 degrees to the horizontal plane of the vehicle.

12. The method as defined in claim 8, wherein the other ends of the upper and lower straps are secured around the respective upper portions of the bicycle by first passing each strap through the loop at the other end to form an adjustable loop to be tightened around the respective upper portions of the bicycle.

* * * * *